United States Patent [19]

Di Trapani

[11] Patent Number: 5,624,591
[45] Date of Patent: Apr. 29, 1997

[54] HEATED GLAZING PANEL AND A CIRCUIT FOR CONTROLLING THE HEAT OUTPUT AS A FUNCTION OF THE RESISTANCE OF THE HEATER ELEMENT AND VOLTAGE OF THE POWER SOURCE

[75] Inventor: Agostino Di Trapani, Saint-Vaast, Belgium

[73] Assignee: Glaverbel, Brussels, Belgium

[21] Appl. No.: 526,777

[22] Filed: Sep. 12, 1995

[30] Foreign Application Priority Data

Sep. 14, 1994 [GB] United Kingdom .............. 9418477

[51] Int. Cl.$^6$ .............. H05B 3/06; H05B 3/16; H01C 1/012
[52] U.S. Cl. .............. 219/522; 219/203; 219/543; 219/548; 219/497; 338/308
[58] Field of Search .............. 219/203, 522, 219/548, 202, 543, 482, 490, 497; 338/308–309; 52/171.2; 244/134 D

[56] References Cited

U.S. PATENT DOCUMENTS

| | | | |
|---|---|---|---|
| 3,876,862 | 4/1975 | Newman et al. | 219/509 |
| 3,982,092 | 9/1976 | Marriott | 219/203 |
| 4,057,671 | 11/1977 | Shoop | 219/203 |
| 4,127,765 | 11/1978 | Heaney | 219/218 |
| 4,278,875 | 7/1981 | Bain | 219/522 |
| 4,410,843 | 10/1983 | Sauer et al. | 318/467 |
| 4,459,470 | 7/1984 | Shlichta et al. | 219/522 |
| 4,507,547 | 3/1985 | Taga et al. | 219/543 |
| 4,952,783 | 8/1990 | Aufderheide et al. | 219/548 |
| 5,270,517 | 12/1993 | Finley | 219/543 |
| 5,354,966 | 10/1994 | Sperbeck | 219/522 |
| 5,360,962 | 11/1994 | Pettit | 219/499 |
| 5,418,025 | 5/1995 | Harmand et al. | 219/522 |

FOREIGN PATENT DOCUMENTS

| | | |
|---|---|---|
| 0349916 | 1/1990 | European Pat. Off. . |
| 0010667 | 11/1965 | United Kingdom . |
| 1420150 | 1/1976 | United Kingdom . |

Primary Examiner—Teresa J. Walberg
Assistant Examiner—Raphael Valencia
Attorney, Agent, or Firm—Spencer & Frank

[57] ABSTRACT

A glazing panel includes at least one sheet of vitreous material; a conductive transparent coating which is provided on at least one face of at least one sheet of the at least one sheet of vitreous material and which constitutes a heating element for the glazing panel when connected to an electrical power source; and a control circuit for controlling heating power output of the glazing panel, the control circuit including adjustable means for controlling the heating power output to a preselected level as a function of voltage of the electrical power source and electrical resistance of the heating element.

21 Claims, 2 Drawing Sheets

HEATED GLAZING PANEL AND A CIRCUIT FOR CONTROLLING THE HEAT OUTPUT AS A FUNCTION OF THE RESISTANCE OF THE HEATER ELEMENT AND VOLTAGE OF THE POWER SOURCE

CROSS-REFERENCE TO RELATED APPLICATION

This application claims the priority of United Kingdom Patent Application Ser. No. 94 18 477.7 of 14 Sep. 1994 and titled "A heated glazing panel and a control circuit for use therewith", the subject matter of which is incorporated herein by reference.

BACKGROUND OF THE INVENTION

1. Field of the Invention

This invention relates to a heated glazing panel and to a control circuit for use therewith.

There is presently a growing demand for heated glazing panels. These heated glazing panels are used for example as heated windscreens in motor vehicles, locomotives, metro trains, aeroplanes etc. as heated rear windows in vehicles or as heated glazing panels for buildings. They may particularly be used for removing steam, moisture or frost which hinders the visibility through the panel. They may also be used as an additional source of heat or for eliminating cold wall effects and improving the comfort of the occupants.

The present invention concerns heated glazing panels which comprise a sheet of glass on one face of which is disposed a thin coating of conductive transparent material which constitutes a heating element for the panel when the coating is connected to a source of electrical power. This coating is for example formed of ITO (indium/tin oxide) or by $SnO_2$ doped with fluorine, deposited by pyrolysis for example, or by a layer based on silver or gold deposited for example by cathodic vacuum sputtering (for example $Bi_2O_3$/Au/$Bi_2O_3$ or $SnO_2$/Ag/Ti/$SnO_2$ coatings).

2. Description of the Related Art

It is known from British patent GB 1420150 (Glaverbel-Mecaniver) to provide a control circuit for a heating element incorporated in a hollow glazing unit, the control circuit including an adjustable resistor according to the setting of which the temperature control range of the panel is determined, preferably in response to a temperature sensor. Such a circuit however is unable to adapt for sources of electrical power of differing nature. If the power supply differs from that for which such a control circuit was specifically designed, the heating power output of the glazing panel may be insufficient and the desired temperature range may not be achievable.

Depending upon the dimensions of the panel and the voltage and nature of the electrical power supply, it is necessary to adapt the total electrical resistance of the heating element in order to obtain the desired electrical power which corresponds to the required effect.

It is not economically profitable to adapt the construction to modify the specific resistance or the thickness of the coating according to specific needs for each application and to each form of the panel, for example the dimensions thereof. Further, it is difficult in certain cases, to find a compromise between the desired optical properties of the panel and the specific electrical resistance of the coating.

It has been proposed that in order to adapt the heating output of a given glazing panel to the nature of the electrical power supply to which it is to be connected, that the coating be cut according to a predetermined scheme, thereby to change the electrical resistance thereof.

It is however difficult to remove the coating and cut it in a manner to achieve a sufficient interruption to electrically isolate two portions of the coating without risk of failure of the isolation over time, and without the cut portion being visible. In general, this process leads to a fine band of slightly different colour, which may be situated in the visibility zone of the vehicle driver and may distract his attention. It is in any case unattractive. This cutting away of the coating also necessitates an added cost in the construction of the panel.

SUMMARY OF THE INVENTION

It is an object of the present invention to provide a heated glazing panel in which the disadvantages referred to above are minimised or avoided by providing a panel which is easily adaptable to the characteristics of the electrical power supply to which it is connected.

According to a first aspect of the invention there is provided a glazing panel comprising at least one sheet of vitreous material carrying a conductive transparent coating which constitutes a heating element for the panel when connected to an electrical power source, characterised in that the panel comprises a control circuit for controlling its heating power output, said control circuit including adjustable means for adapting to a desired level the heating power output as a function of the voltage of the electrical power source and the electrical resistance of the heating element.

According to a second aspect of the invention, there is provided a control circuit for controlling the heating power output of a glazing panel comprising at least one sheet of vitreous material carrying a conductive transparent coating which constitutes a heating element for the panel when connected to an electrical power source, characterised in that said control circuit includes adjustable means for adapting to a desired level the heating power output as a function of the voltage of the electrical power source and the electrical resistance of the heating element.

The arrangement according to the invention allows the adjustment of the electrical voltage applied to the heated panel, starting from the local source voltage (for example 220 V for some trains) according to the electrical characteristics of the installed heated panel.

Starting from a series of coated panels, this arrangement allows one to obtain for each panel a specific electrical heating output power specified by the required specification by taking account of the type of coating and the dimensions of the coating. It also permits one to optionally modify the specific heating output power of the heated panel during its installation if one finds, for example, that the heating output power set out in the specification is not correct or does not take into account the specific power requirements at the place of installation. Also, certain temporary conditions, such as a momentary increasing demand for power, can be accommodated.

Preferably, the glazing panel according to the present invention additionally includes temperature control. Thus, the circuit preferably includes a temperature sensor positioned to sense the temperature of the panel and temperature control means responsive to the output of the sensor for maintaining the temperature of the panel at a predetermined value. The sensor may be in thermal contact with at least one vitreous material sheet of the panel.

The temperature control means preferably includes means for interrupting the flow of electric current to the heating element when a predetermined temperature threshold is reached, to avoid damage to the panel which might be caused if too high a temperature were to be generated.

For a heated panel the specific power demand is generally between 400 and 1500 W/m². A specific power of 750 W/m² leads in general to a temperature of about 60° C. With a power of 1000 W/m², one may achieve 85° to 90° C. In the case of a laminated panel having an intervening layer of thermoplastic adhesive (in general PVB, i.e. polyvinyl butyral) it is necessary to take account of the fact that the PVB becomes fluid from 80° C. and that there may be a development of blisters which may lead to delamination of the laminated panel. With a specific power of more than 750 W/m² it is therefore advisable to provide a means for thermostatic shutting off of the current or a regulation of the temperature, in order to avoid exceeding 80° C.

These embodiments of the present invention allow one to regulate the temperature of the heated panel.

Preferably, the control circuit includes a triac which modulates the current supply to the heating element according to the command voltage of its gate. A triac is a bi-directional triode thyristor. The triac has the unique capacity of being triggered by either a positive or a negative gate signal regardless of the voltage polarity across the main terminals of the device.

Preferably, the control circuit is housed in a box which is secured to a vitreous material sheet of the panel. The box may be formed of a thermally conductive material, preferably aluminium. For example, the circuit is assembled in a small aluminium box about 5 cm×5 cm×25 mm high connected to the panel with suitable adhesive over several cm of the edge.

The panel may be constructed in a number of different forms. Of particular interest are laminated panels comprising at least two sheets of vitreous material separated by a film of thermoplastic material.

The panel may be in the form of a windscreen for a vehicle, but may also be used in side and rear windows of vehicles or in buildings.

In one preferred embodiment, the coating comprises doped $SnO_2$. Although the electrical resistance of doped tin oxide coatings deposited by pyrolysis usually varies according to the method of production and despite the fact that it is very difficult to remove parts of the coatings deposited by pyrolysis, the present invention allows one to easily make use of such pyrolytically deposited coatings.

In another preferred embodiment, the coating is a multi-layer coating comprising at least one coating formed of a material selected from silver and gold.

For a panel in which the coating has a square form, having a specific electrical power of 750 W/m² and powered at 220 V, it is necessary to have a specific resistance of about 70 ohms/□ in order to obtain the nominal power of the panel, that is to say that in as much as the surface of the coating is a square, its resistance is 70 ohms whatever the dimensions of that square may be. Gold, conventionally applied as a $Bi_2O_3/Au/Bi_2O_3$ coating (Raybel—Trade Mark), provides a specific resistance of from 12 to 22 ohms/□ and a conventional coating based on silver deposited by cathodic vacuum sputtering provides a specific resistance of from 7 to 8 ohms/□. With an applied potential under 220 V, these coatings are able to generate too much heat for the panel so that it may reach too high a temperature. The arrangement according to the invention provides a solution to this problem, by adapting the potential to be applied to the coating.

When the panel has a rectangular coating area, the total resistance of the heating circuit depends upon the dimensions of the coating.

BRIEF DESCRIPTION OF THE DRAWINGS

The invention will now be further described, purely by way of example, by reference to the accompanying drawings in which:

FIG. 1b shows a diagrammatic cross-section through the glazing panel shown in FIG. 1a.

DESCRIPTION OF THE PREFERRED EMBODIMENTS

Figure 1A:
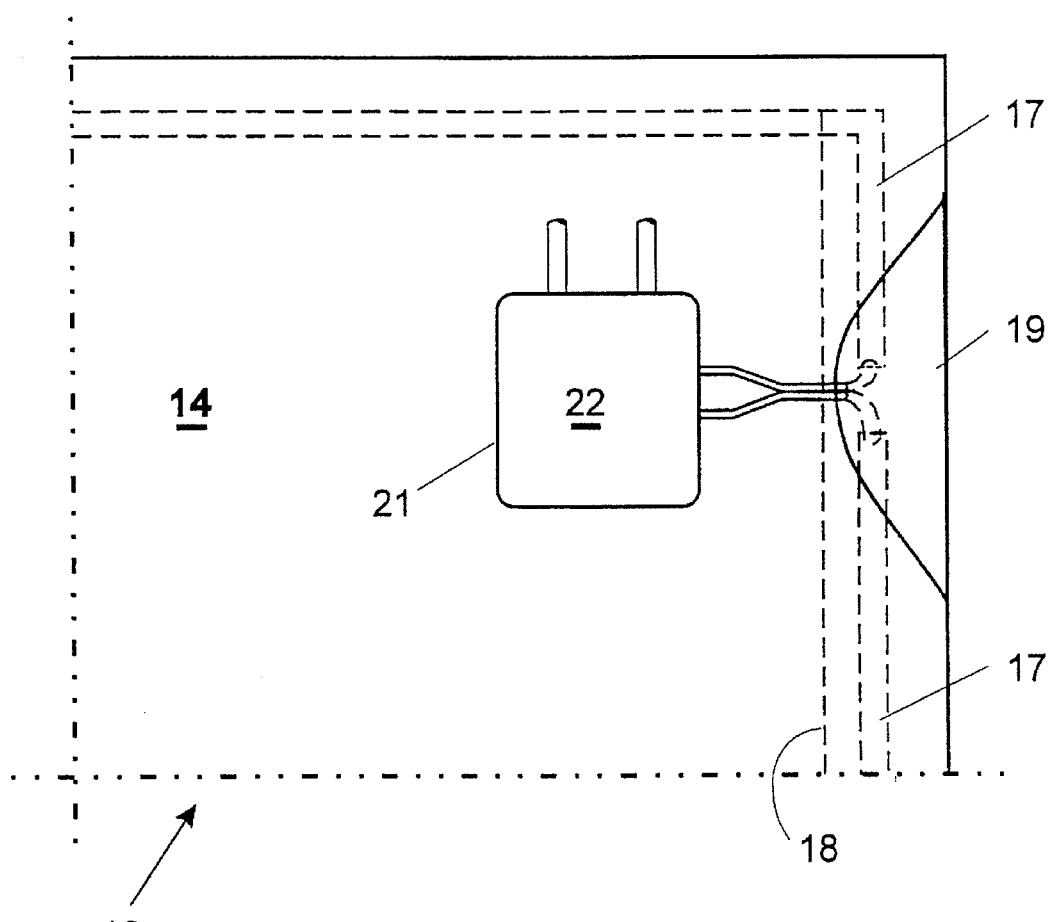
FIG. 1a shows a front view of part of a glazing panel according to the present invention.
Figure 1B:
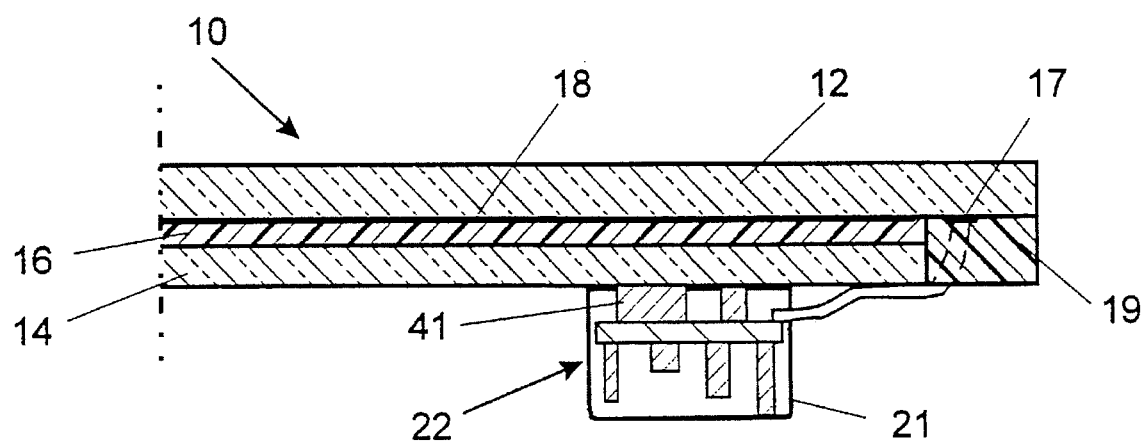
Figure 2:
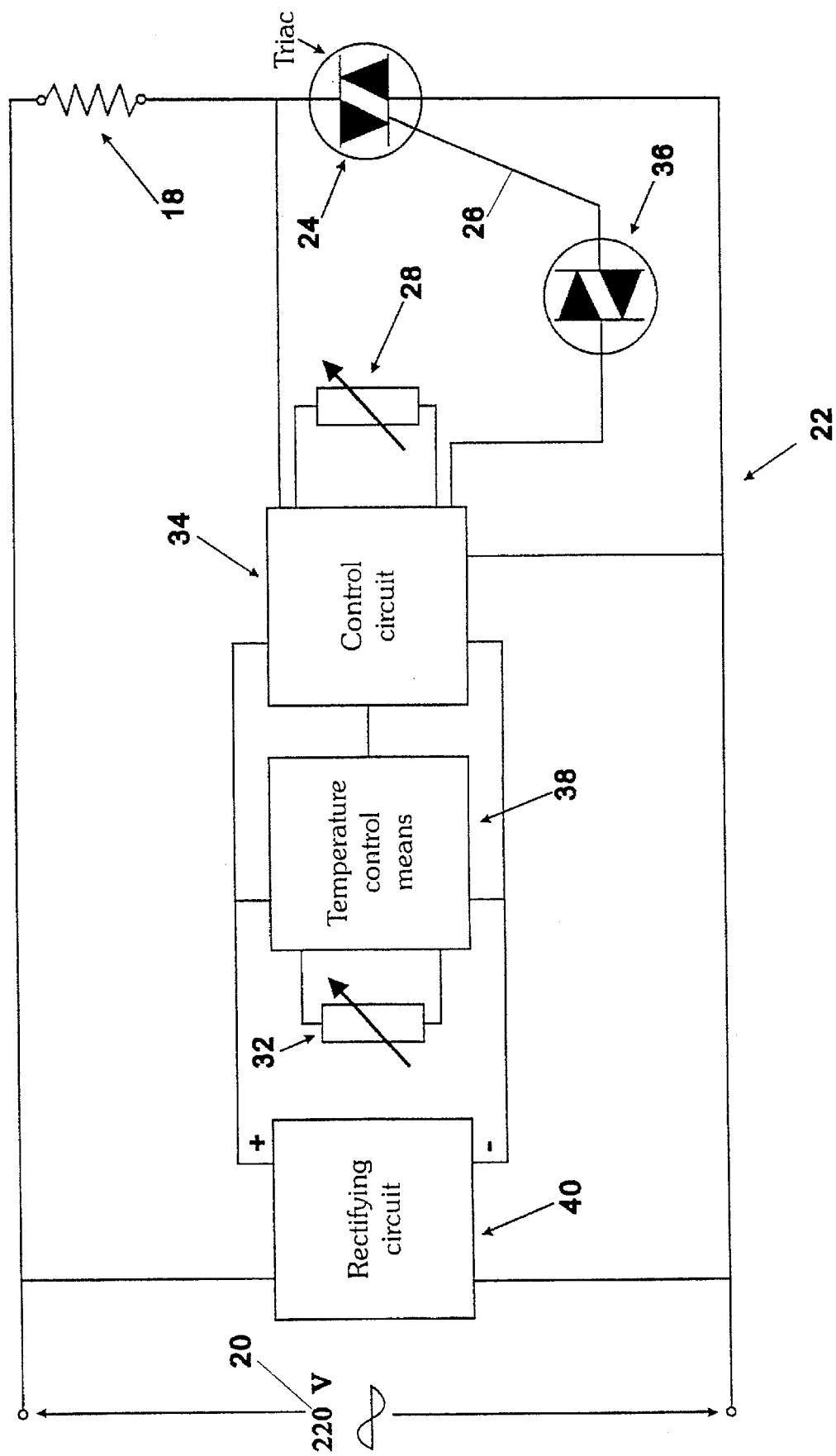
FIG. 2 shows a diagrammatic representation of the control circuit used with the glazing panel shown in FIGS. 1a and 1b.

Referring to the drawings, there is shown a glazing panel 10 constituting, for example, the windscreen of a vehicle. The panel has a laminated construction comprising two sheets 12, 14 of glass separated by a film 16 of thermoplastic material. One glass sheet 12 carries a coating 18 of doped $SnO_2$ which constitutes a heating element for the panel when the coating is connected to a source 20 of electrical power. A control circuit 22 is provided for controlling the heating power output of the panel, the control circuit 22 being connected to the coating 18 by way of current collectors 17. Access to the current collectors 17 is by way of a cut-out edge portion of glass sheet 14, which is subsequently filled with an epoxy resin 19.

The control circuit is housed in a box 21 formed of aluminium, which is secured to the glass sheet 14 of the panel.

The control circuit 22 includes a triac 24 which modulates the current supply to the heating element 18 according to the command voltage of its gate 26. The control circuit includes an adjustable resistor 28 for adapting the heating power output of the panel in relation to the electrical power source to a desired level.

The control circuit also includes a temperature control means 38 which includes a temperature sensor (41) in thermal contact with the glass sheet 14 of the panel to sense the temperature of the panel. The temperature control means 38 is responsive to the output of the sensor for maintaining the temperature of the panel at a predetermined value. The desired temperature is preset by an adjustable resistor 32. The temperature control means 38 includes also means for interrupting the flow of electric current to the heating element when a predetermined temperature threshold is reached, to avoid damage to the panel which might be caused if too high a temperature were to be generated.

The triac 24 (for example a 50A triac) modulates the electric current passing therethrough according to the command voltage of its gate 26, thereby controlling the voltage applied to the heating element 18. This control is obtained by the application of a command voltage from a trigger diode 36 sufficient for the triac gate 26.

When the voltage is increased between the terminals of the triac 24, a point is reached, called the break-over voltage $V_{BO}$, at which the triac switches from a high impedance state to a low impedance state. The current can then be increased through the triac 24 with only a small increase in voltage across the device. The triac 24 remains in the ON state until the current through the main terminals drops below a value, called the holding current, which cannot maintain the break-over condition. The triac 24 then reverts again to the high impedance or OFF state. If the voltage between the main terminals of the triac 24 is reversed, the same switching action occurs. Thus the triac 24 is capable of switching from the OFF state to the ON state for either polarity of voltage applied to the main terminals. When a trigger current from the trigger diode 36 is applied to the gate terminal 26 of the triac 24, the break-over voltage is reduced. After the triac 24 is triggered, the current flow through the main terminals is independent of the gate signal and the triac remains in the ON state until the principal current is reduced below the holding current level.

The trigger diode 36 is controlled by the electronic circuit 34, including the regulating potentiometer 28, which allows the adjustment of the effective exit voltage of the triac 24 according to the type of coating, according to the dimensions of the coating and according to the desired specific power, by being active on the triac gate 26.

The command voltage of the triac gate is also influenced by the electronic circuit 38, including the temperature sensor in thermal contact with the panel, which controls the temperature of the panel. This temperature sensor, for example in the form of a thyristor, may be in direct contact with the glass sheet 14 through an opening formed in the aluminium box 21 containing the control circuit 22. It may also be in contact with the aluminium at the interior of the box 21 in order to ensure a good thermal contact between the panel and the thyristor. The electronic circuit 38 influences the gate 26 of the triac 24 in a manner to regulate the temperature of the panel to the desired level. The potentiometer 32 allows adjustment of the desired temperature.

A rectifying circuit 40 supplies the power required for the control circuits 34 and 38.

The nature of the supply of the local electricity distribution may vary considerably according to the application. The AC supply is not necessarily in the sinusoidal wave form: the type of wave may be for example a square wave. A wave of higher frequency may even be superimposed on a sinusoidal wave of 50 Hz base. The frequency may be 50 or 60 Hz. One may provide therefore an element exterior to the box 21 (for example a condenser, or a resistance—not shown) in order to adapt the arrangement to the nature of the supply.

In the case of a DC supply, for example for automobile applications, one may first of all produce a high frequency AC alternative for the arrangement described above or use a multivibrator to produce a pulsed current of which the conduction and non-conduction times are adjustable.

In the applications for automobiles, the resistance is sometimes too high for the DC supply which has a very low voltage. In this case, the conversion to AC voltage passage allows one to increase the potential applied to the control circuit.

If desired, the box 21 may be formed in two parts. A small box part contains the electronic circuit 22, except the triac 24, and another box part contains the triac 24, which dissipates energy and becomes hot. The cooling of the triac is achieved by the heat therefrom being dissipated by the panel 10.

What is claimed is:

1. A glazing panel, comprising:
   at least one sheet of vitreous material;
   a conductive transparent coating which is provided on at least one face of at least one sheet of the at least one sheet of vitreous material and which constitutes a heating element for the glazing panel when connected to an electrical power source; and
   a control circuit for controlling heating power output of the glazing panel, the control circuit comprising adjustable means for controlling the heating power output to a preselected level as a function of voltage of the electrical power source and electrical resistance of the heating element.

2. The glazing panel according to claim 1, further comprising a box for housing the control circuit, which box is secured to one sheet of the at least one sheet of vitreous material.

3. The glazing panel according to claim 2, wherein the box is comprised of a thermally conductive material.

4. The glazing panel according to claim 3, wherein the box is comprised of aluminum.

5. The glazing panel according to claim 1, wherein the control circuit further comprises a triac which has a gate controlled by a command voltage applied at the gate and which modulates current supply to the heating element according to the command voltage applied at the gate.

6. The glazing panel according to claim 1, wherein the control circuit further comprises a temperature sensor which is positioned to sense temperature of the glazing panel and which provides a sensor output, and temperature control means responsive to the sensor output for maintaining the temperature of the glazing panel at a preselected value.

7. The glazing panel according to claim 6, wherein the temperature sensor is in thermal contact with at least one sheet of the at least one sheet of vitreous material.

8. The glazing panel according to claim 6, wherein the temperature control means comprises means for interrupting flow of electric current to the heating element when a preselected temperature threshold is reached.

9. The glazing panel according to claim 6, wherein the control circuit further comprises a triac which has a gate having a command voltage and which modulates current supply to the heating element according to the command voltage of the gate.

10. The glazing panel according to claim 1, wherein the glazing panel is a laminated panel comprising at least two sheets of vitreous material separated by a film of thermoplastic material.

11. The glazing panel according to claim 1, wherein the glazing panel has a form preselected as a windscreen for a vehicle.

12. The glazing panel according to claim 1, wherein the conductive transparent coating comprises doped $SnO_2$.

13. The glazing panel according to claim 1, wherein the conductive transparent coating is a multi-layer coating comprising at least one layer composed of a material selected from the group consisting of silver and gold.

14. A control circuit for controlling heating power output of a glazing panel comprising at least one sheet of vitreous material; and a conductive transparent coating which is provided on at least one face of at least one sheet of the at least one sheet of vitreous material and which constitutes a heating element when connected to an electrical power source, the control circuit comprising:
   adjustable means for controlling the heating power output to a preselected level as a function of voltage of the electrical power source and electrical resistance of the heating element.

15. The control circuit according to claim 14, further comprising a box for housing the control circuit, which box is secured to one sheet of the at least one sheet of vitreous material.

16. The control circuit according to claim 15, wherein the box is comprised of a thermally conductive material.

17. The control circuit according to claim 16, wherein the box is comprised of aluminum.

18. The control circuit according to claim 14, further comprising a triac which has a gate having a command voltage and which modulates current supply to the heating element according to the command voltage of the gate.

19. The control circuit according to claim 14, further comprising a temperature sensor which is positioned to sense temperature of the glazing panel and which provides a sensor output, and temperature control means responsive to the sensor output for maintaining the temperature of the glazing panel at a preselected value.

20. The control circuit according to claim 19, wherein the temperature control means includes means for interrupting flow of electric current to the heating element when a preselected temperature threshold is reached.

21. The control circuit according to claim 19, further comprising a triac which has a gate having a command voltage and which modulates current supply to the heating element according to the command voltage of the gate.

* * * * *